United States Patent
Frank et al.

(10) Patent No.: US 7,669,048 B2
(45) Date of Patent: Feb. 23, 2010

(54) COMPUTING DEVICE LIMITING MECHANISM

(75) Inventors: Alexander Frank, Bellevue, WA (US); William J. Westerinen, Issaquah, WA (US); Curt A. Steeb, Redmond, WA (US); Zhangwei Xu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 546 days.

(21) Appl. No.: 11/515,410

(22) Filed: Aug. 31, 2006

(65) Prior Publication Data

US 2007/0136570 A1 Jun. 14, 2007

Related U.S. Application Data

(60) Provisional application No. 60/749,114, filed on Dec. 9, 2005.

(51) Int. Cl.
*G06F 9/00* (2006.01)
(52) U.S. Cl. .................... 713/2; 713/1; 713/100; 705/52; 705/61; 705/77; 705/400; 705/418; 709/208
(58) Field of Classification Search ............ 713/1, 713/2, 100; 705/52, 61, 77, 400, 418; 709/208
See application file for complete search history.

(56) References Cited

U.S. PATENT DOCUMENTS

| | | | | |
|---|---|---|---|---|
| 5,768,382 | A | | 6/1998 | Schneier et al. |
| 5,892,906 | A | * | 4/1999 | Chou et al. .................. 726/19 |
| 6,308,209 | B1 | * | 10/2001 | Lecheler .................... 709/224 |
| 6,367,017 | B1 | * | 4/2002 | Gray ............................ 726/9 |
| 6,556,894 | B1 | * | 4/2003 | Nguyen ..................... 700/275 |
| 6,618,810 | B1 | * | 9/2003 | Dirie ........................... 726/27 |
| 6,738,810 | B1 | * | 5/2004 | Kramer et al. .............. 709/224 |
| 7,318,173 | B1 | * | 1/2008 | Falik et al. .................... 714/36 |
| 7,406,446 | B2 | * | 7/2008 | Frank et al. ................... 705/52 |
| 7,421,413 | B2 | * | 9/2008 | Frank et al. ................. 705/418 |
| 7,451,478 | B2 | * | 11/2008 | Yang ............................. 726/2 |
| 2002/0123964 | A1 | * | 9/2002 | Kramer et al. ............... 705/40 |
| 2002/0173977 | A1 | * | 11/2002 | Dutta ............................ 705/1 |

(Continued)

OTHER PUBLICATIONS

Office Action Summary ; U.S. Appl. No. 11/612,435, filed Dec. 18, 2006; First Named Inventor: William J. Westerinen; Mailing Date: May 27, 2009; pp. 13.

*Primary Examiner*—Thomas Lee
*Assistant Examiner*—Jaweed A Abbaszadeh
(74) *Attorney, Agent, or Firm*—Marshall, Gerstein & Borun LLP

(57) ABSTRACT

Described is a technology by which a computing device is booted into a normal mode of operation or a limited mode of operation, depending on whether the computing device was operating correctly (e.g., with respect to policy) prior to a reboot. The reboot may be forced. Examples of incorrect state include an overdue payment on a leased computer, or improper execution of certain important software. A metering mechanism evaluates the state of the computing device, and when an incorrect state is detected, configures the computing device for operation in the limited mode, by setting the computing device to boot via one boot path (e.g., a limited-mode BIOS) instead of another boot path (e.g., a normal-mode BIOS). A BIOS selector switches to the limited BIOS on the next reboot, wherein the computing device is restricted to the limited mode of operation (regardless of subsequent reboots) until the correct state is restored.

10 Claims, 3 Drawing Sheets

U.S. PATENT DOCUMENTS

| | | | |
|---|---|---|---|
| 2002/0198834 A1* | 12/2002 | Kramer et al. | 705/40 |
| 2003/0004875 A1* | 1/2003 | Kramer et al. | 705/40 |
| 2003/0084341 A1* | 5/2003 | Ramachandran et al. | 713/201 |
| 2003/0135380 A1* | 7/2003 | Lehr et al. | 705/1 |
| 2004/0158702 A1* | 8/2004 | Tasaki | 713/2 |
| 2005/0273588 A1* | 12/2005 | Ong et al. | 713/2 |
| 2006/0107329 A1* | 5/2006 | Frank et al. | 726/26 |
| 2006/0136736 A1* | 6/2006 | Yang | 713/183 |
| 2006/0156008 A1* | 7/2006 | Frank | 713/176 |
| 2006/0165005 A1* | 7/2006 | Frank et al. | 370/250 |
| 2006/0206718 A1* | 9/2006 | Frank et al. | 713/182 |
| 2006/0236084 A1* | 10/2006 | Wu et al. | 713/2 |
| 2007/0061268 A1* | 3/2007 | Herold et al. | 705/59 |
| 2007/0061535 A1* | 3/2007 | Xu et al. | 711/167 |
| 2007/0150681 A1* | 6/2007 | Frank et al. | 711/163 |

\* cited by examiner

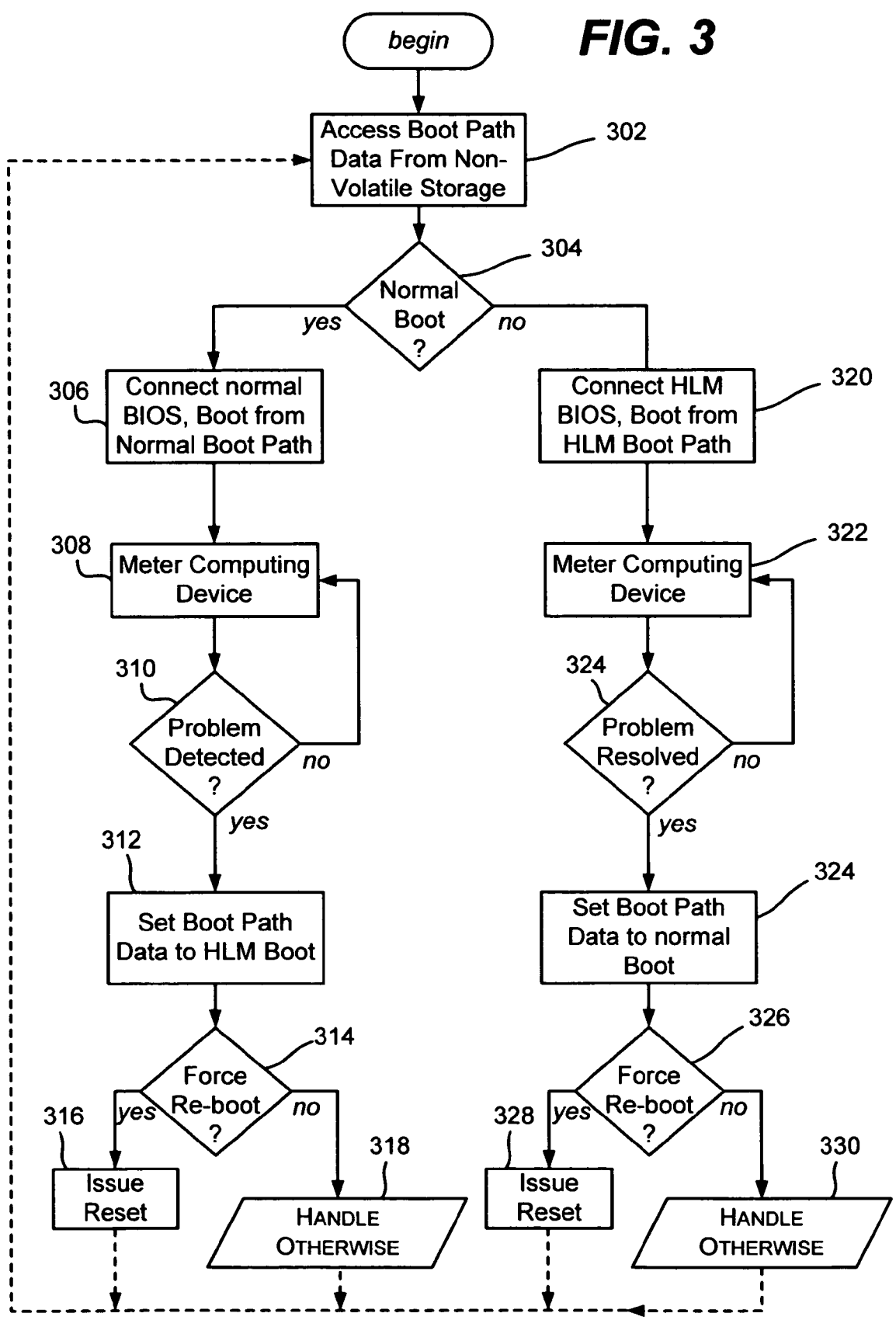

US 7,669,048 B2

COMPUTING DEVICE LIMITING MECHANISM

CROSS REFERENCE TO RELATED APPLICATION

The present invention claims priority to U.S. provisional patent application Ser. No. 60/749,114, filed Dec. 9, 2005, which is hereby incorporated by reference.

BACKGROUND

Some computing devices such as mobile telephones are sold or leased on a prepaid/subscription basis, wherein a computing device herein is considered any device having a processor capable of executing instructions. In the future, more sophisticated computing devices, including general purpose personal computer systems, will be sold or leased on a prepaid/subscription basis. Attempts to modify such computer systems to avoid or reduce payment or will certainly be attempted.

As can be readily appreciated, software by itself is not a particularly reliable way to ensure that a computing device has not been modified to avoid or reduce payment. This is because programmers can change and/or patch the operating system code, install devices drivers and services, update components and so forth. For example, if software performed the payment status check, a malicious programmer (hacker) can patch a prepaid/subscription computer system to never check for payment status, or alternatively, to intercept the results of such a status check and convert a "not-paid" return status to a "paid" status.

As a result, various hardware-based ways to make a computer system or other computing device resilient to such modifications are being developed. For example, hardware can evaluate whether and when some certain set of code is executing, and act directly on the result. Defeating such hardware-based solutions would require physical actions such as making physical changes to the motherboard (e.g., cutting a power line to a chip), replacing a hardware chip or set of chips, and so forth. This can be made even more difficult through the use of glue and/or special packaging that make it harder to remove and replace a chip, and/or by requiring special communication (e.g., a heartbeat) with a chip that ensures it is still present.

Assuming that a computer system or other device may be made resistant to tampering, at least to the extent that doing so is not cost effective, another concern is what to do with respect to enforcement when an adverse issue such as unpaid status or tampering is detected. One solution would be to render the computing device completely unable to operate. However, this drastic solution has a major drawback in that such a computing device cannot be used at all, which means it cannot be used to renew an inadvertently-lapsed subscription for example. As such, enforcement that in some way limits the computer system's functionality is generally more desirable than totally disabling a system.

However, such an enforcement solution itself cannot be something that is easy to tamper with. Otherwise the enforcement solution that causes some adverse effect following the detection of a problem could be bypassed or modified to leave the computer system fully functional.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards detecting when a computing device is not operating in a correct operating state, for example, if a payment is overdue on a leased computer. Upon detection, the computing device is configured such that a subsequent reboot of the computing device boots the computing device into a limited mode of operation. The rebooting may be forced.

In an example implementation, a metering mechanism evaluates the state of the computing device, and when an incorrect state (e.g., with respect to policy) is detected, configures the computing device for operation in the limited mode. In this example implementation, the computing device is set to boot via a boot path corresponding to the limited mode of operation (e.g., one BIOS or booting code) instead of a boot path corresponding to a normal mode of operation (e.g., a different BIOS or other booting code). A BIOS/booting code selector switches to the limited BIOS/booting code on the next reboot, whereby the computing device is restricted to the limited mode of operation (regardless of subsequent reboots) until the correct state (e.g., with respect to the policy) is restored.

Thus, a metering mechanism observes a state of the computing device. A selector coupled to the metering mechanism operates the computing device using a first set of instructions including first boot path instructions when the metering device indicates the computing device was operating in one state prior to reboot, or operates the computing device using a second set of instructions including second boot path instructions when the metering device indicates that the computing device was operating in another state prior to reboot. The first set of instructions may be contained within a first BIOS component or booting code, and the second set of instructions contained within a second BIOS component or booting code. The metering mechanism, the selector, and the second set of instructions (and optionally the first set of instructions) may be contained in a secure execution environment, which, for example, may be incorporated in a separate hardware component such as a multiple-chip module.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which:

FIG. 3 is a flow diagram representing example logic for selectively operating a computing device in a limited mode or a normal mode.

DETAILED DESCRIPTION

Various aspects of the technology described herein are directed towards a technology by which a computing device (e.g., a computer system or other processor-controlled device such as a mobile phone) may be made to operate in some limited mode in response to a detected issue (e.g., corresponding to a current operating state) with some aspect of that computer system or device. For example, certain hardware may be locked or made to operate with reduced functionality, e.g., the CPU may be slowed down, less memory may be made available, peripheral devices (e.g., USB-based) may not work, the computer or device may automatically freeze and/or reboot every N minutes, and so forth. Software may also be limited in its functionality or ability to execute.

One way that such limiting may be accomplished is by having the computer system or device boot up using different boot instruction paths and/or using different runtime services. For example, if there is no detected adverse issue, one set of instructions will be executed to boot the computer or other device to operate normally. If there is at least one adverse issue detected, the other boot instruction path will be executed to boot the computer or other device into some limited operational state. There may be more than two boot paths, e.g., one for normal operation, one for a first type of limited operation corresponding to a first operating state, another for a second type of limited operation corresponding to a second operating state, and so forth. Note that it is feasible to have one state (such as a premium subscriber) correspond to enhanced functionality via a boot path/runtime services that are enhanced relative to a normal BIOS.

In one example implementation described herein, the limiting mechanism is described in the example environment of a general purpose computer system, in which dual boot paths are implemented using two BIOS (basic input/output system) stacks, namely a normal BIOS and an HLM (hardware locking mode/hardware locked mode/hardware limiting mode) BIOS. A hardware-based mechanism controls which of the BIOSes is in effect. As can be readily appreciated, this is only one way to implement dual boot paths, and, for example, a single BIOS may be controlled to skip certain commands and the like when booting to a limited operational state. Further, a BIOS typically provides some runtime services, and a BIOS may provide limited runtime services relative to a normal BIOS. Moreover, booting code may be contained in a medium other than a BIOS.

As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing devices including general purposes computing systems in general.

Figure 1:
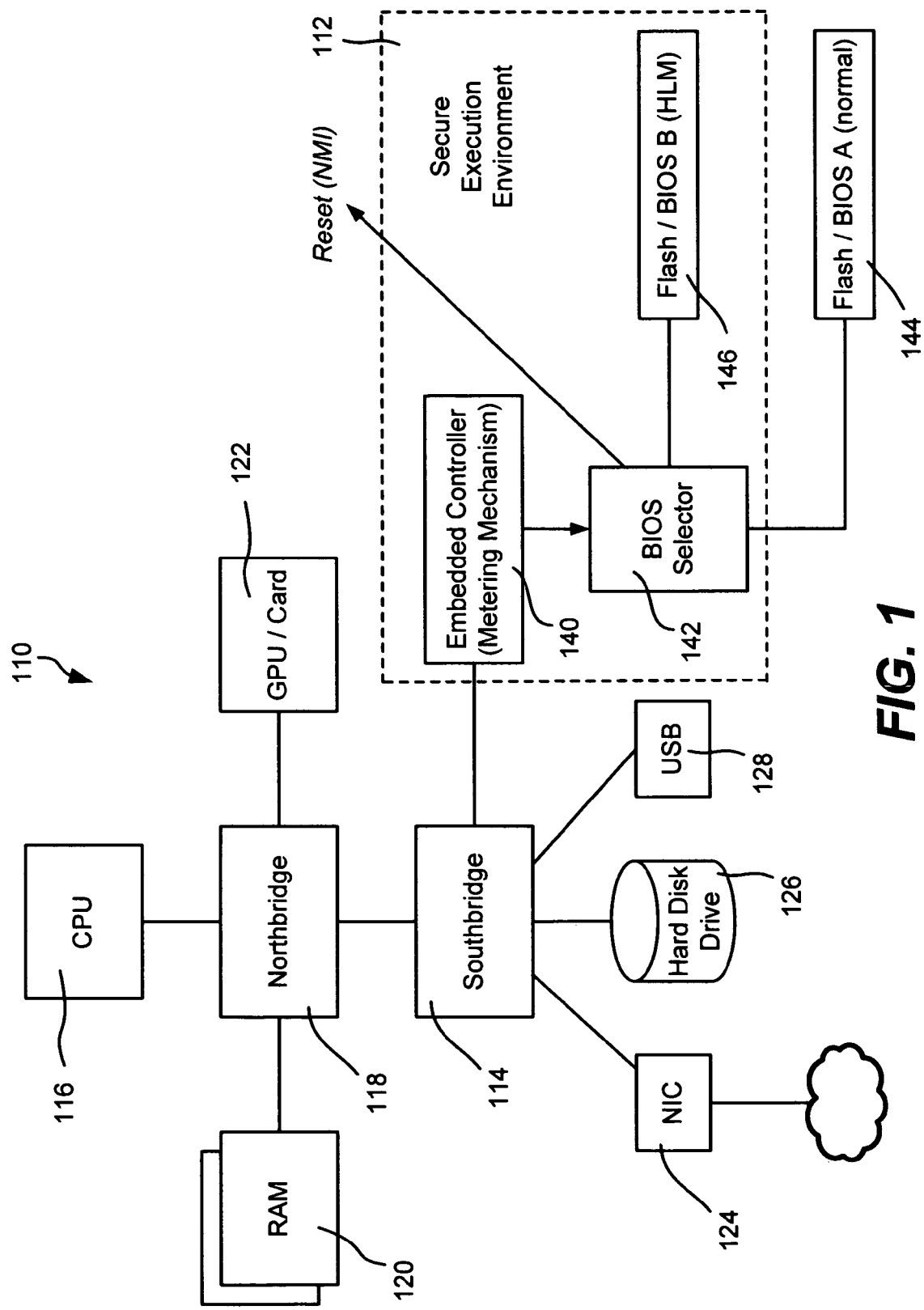
FIG. 1 shows an illustrative example of a general-purpose computing environment into which various aspects of the present invention may be incorporated.

FIG. 1 shows an example configuration in which a general purpose computer system 110 includes a secure execution environment 112, e.g., coupled to other conventional computer system components via a Southbridge chip 114. As is typical, the example computer system 110 of FIG. 1 includes a processing unit (CPU) 116, which is coupled via a Northbridge chip 118 to RAM 120 and a graphics processing unit (GPU/Card) 122. As is also typical, the Southbridge chip 114 is shown as connecting to a network interface card (NIC) 124 for remote connectivity, to storage exemplified in FIG. 1 as hard disk drive 126, and to other ports for device connectivity, exemplified in FIG. 1 as universal serial bus (USB) interface 128.

Note that FIG. 1 is only one example architecture; other alternatives may include having the secure execution environment 112 linked to the Northbridge (NB), and/or USB interface, which would enable the operating system (e.g., Windows®) to interact with its components via a standard device driver model. Other alternatives include incorporating at least part of the secure execution environment 112 into a motherboard chip, such as the CPU or memory controller.

In one example implementation, the secure execution environment 112 includes an embedded controller or the like that acts as a metering mechanism 140 that evaluates the state of the computer system 110 and enforces some policy with respect to how the computer system operates based upon the metered state. In one implementation, the embedded controller/metering mechanism 140 is also referred to as a provisioning module, because it evaluates whether the computing device is properly provisioned with respect to a subscription/lease, e.g., whether payment is up to date.

In general, and as described below, upon detection of an adverse issue (e.g., an overdue payment) with respect to the state of the computer system, the metering mechanism 140 communicates with a BIOS selector 142, such as to force a reboot, e.g., via the reset NMI (non-maskable interrupt), and also to persist data (e.g., a flag) as necessary indicative of which boot path to execute on the subsequent boot. Note that the BIOS selector 142 (or metering mechanism 140) includes or is otherwise coupled to non-volatile storage so that the knowledge of which boot path to execute survives a power-down state.

In FIG. 1, a dual boot path is exemplified, including a boot to a normal operational state via flash/BIOS A 144, or a boot to a limited (HLM) operational state via flash/BIOS B 146. As can be readily appreciated, there may be additional boot paths for additional different states, and other ways to execute different sets of boot instructions, but for purposes of FIG. 1, the normal versus limited boot path via dual BIOS chips 114 and 146 is explained herein. Note that as represented in FIG. 1, there is no significant security reason to secure the normal boot BIOS A 144; for example, this allows the use of a conventional BIOS chip to be used without having to integrate its code into the secure execution environment 112.

Various ways to provide a secure execution environment 112 are feasible. One way is to incorporate at least part of the secure execution environment into a critical hardware component on the motherboard, such as the CPU, whereby the expense of replacing the component makes tampering impractical. Another way is to closely couple the secure execution environment with other motherboard components, such as by not allowing operation unless (possibly complex) heartbeats to one or more other various motherboard components indicate the secure execution environment is present and operational.

Figure 2:
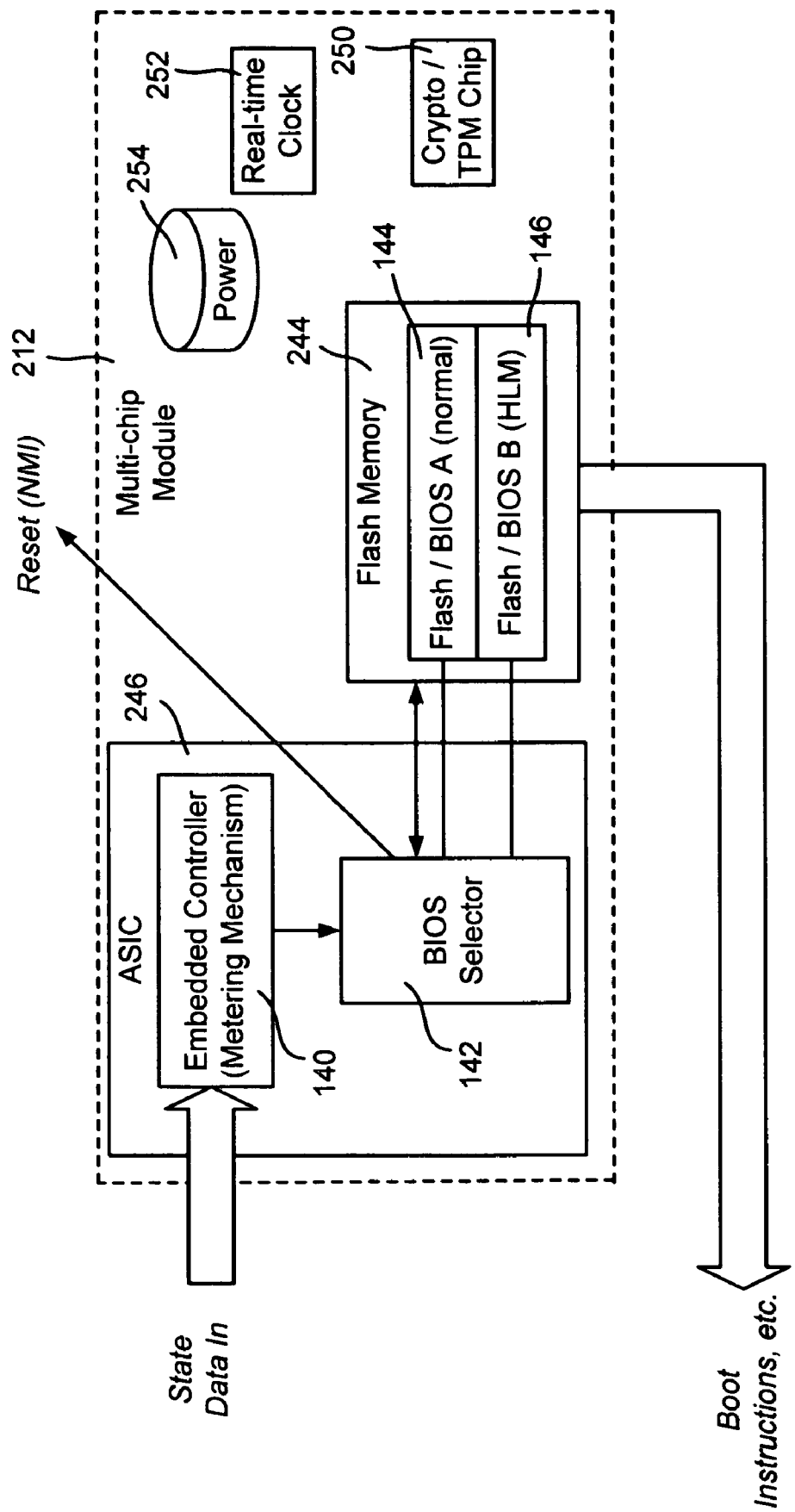
FIG. 2 is a representation of an example implementation having components including logic for selectively operating a computing device in a limited mode or a normal mode.

FIG. 2 provides additional details about one example secure execute environment, in which the secure execute environment components of FIG. 1 are embodied in a multiple-chip module 212. Note that in FIG. 2, one exception to the secure execution environment that is represented in FIG. 1 is that the normal-boot BIOS 144 is part of the multiple-chip module 212, which may be done for various reasons, for example, e.g., to have one flash chip 244 with two distinct storage sections, with the code of a conventional BIOS flashed into one section and the HLM BIOS code flashed into the other. Note that the BIOS selector 142 (or embedded controller 140) may also access the flash 244 for storage, e.g., to maintain which boot path to execute following a power-down state, although other non-volatile storage is feasible.

In the example embodiment of FIG. 2, the embedded controller/metering device 140 and the BIOS selector (switch) 142 are shown as being part of an application-specific integrated circuit (ASIC) 246. Also, the example the multi-chip module 212 of FIG. 2 is shown as further including a cryptographic (smart) chip and/or Trusted Platform Module (TPM)

chip 250 and a real-time clock 252. The chip 250 may store keys and other data for various purposes, such as including subscription and/or payment-related data. The real-time clock may be present to ensure that the secure execution environment operates independently, e.g., to eliminate dependence on an external clock. Device-independent power 254, such as a coin-cell battery, may be internal to or otherwise coupled to the multi-chip module 244, and may be used for battery backed-up internal RAM and the like.

In general, the metering device 140 observes the state of the computer system, for example by watching for expiration of a subscription/lease, and/or by measuring the execution of certain code modules, such as code that computes usage for lease payment data. For example, the embedded controller/metering device 140 may directly watch certain memory at certain times for certain instructions, keeps counters, performs statistical analysis, and/or use other techniques to determine whether a system is "healthy." In the event that payment is overdue and/or watched code is not present and/or not executing properly, a problem will be detected. Note that there is no motive at this point to tamper with the state data corresponding to the code being measured, because doing so will cause detection of a problem, whereas a hacker is trying to avoid such detection.

The metering device 140 thus evaluates the state of the computer system against policy to determine the health of the computer system, e.g., with respect to tampering, overdue payment, or otherwise. One example of a suitable metering device 140 is described as part of U.S. patent application Ser. No. 11/418,710 entitled "Hardware-Aided Software Code Measurement," filed May 5, 2006, assigned to the assignee of the present invention and hereby incorporated by reference. In that description, the metering device comprises an independent (sometimes alternatively referred to as isolated) computation environment (or ICE), which may be any code, microcode, logic, device, part of another device, a virtual device, an ICE modeled as a device, integrated circuitry, hybrid of circuitry and software, a smartcard, any combination of the above, any means (independent of structure) that performs the metering functionality.

In general, the use of a multiple BIOS-based design has a number of advantages with respect to limiting a computer system. For example, conventional BIOSes are complex and impractical to secure to a level to which they can withstand user attacks. By leaving the code of such a conventional BIOS intact, and having the second, HLM BIOS available for alternate booting and operation, the complexity and vulnerability of the normal BIOS is irrelevant. Instead, only the HLM BIOS need be secured (although both BIOSes can be secured as in FIG. 2), and can be coded as simply as possible to avoid the inherent complexity of traditional BIOSes. Note that this may be accomplished because unlike a normal BIOS, the HLM BIOS is not required to provide the same richness of features; indeed, it is desirable to have the HLM BIOS specifically not provide too many features and services.

As one example of a slim and efficient HLM BIOS, consider that code may be needed only for supporting USB1.1, modem, Ethernet, keyboard and mouse operation. As described below, networking and some functionality is desirable to allow the computing device to fix the detected problem, e.g., to run a small application to download one or more provisioning packets, as well as to provide some display capability (e.g., VGA) to display messages to the user, and to operate a keyboard and/or mouse, for example. If the HLM software stack (e.g., the program required for restoring the system) is not stored onto the HLM BIOS flash chip, some hard disk (e.g., ATA) functionality also may be provided.

The HLM BIOS is thus typically very simple, for example as simple as possible to ease threat modeling and correctness.

An example limited operating mode would be one that makes the computing device non-capable of any relevant usage, however it would leave the device sufficiently capable of fixing the problem, e.g., requesting a new provisioning packet from a provisioning datacenter to reenable normal operation. For example, in addition to operating with limited or locked hardware, the HLM may allow execution of an out-of-HLM closed application (e.g. a challenge-response dialog, and/or a tiny network stack to download a provisioning packet to re-enable normal operation). For example, provisioning may use a signed out of HLM packet, and/or challenge/response sequence, in which the packet (and/or challenge/response) is passed to the secure execution environment running on the embedded processor. The code on the embedded processor checks that the packet is signed (and/or encrypted) properly before acting on the out of HLM. Note that alternative designs are feasible, such as x86 real and protected modes and execution rings; in one implementation, HLM code is more privileged than any other functionality while in the HLM mode. The out-of-HLM application may reside in the flash chip 244 used by the HLM BIOS 146, or alternatively, may have its image stored on the hard disk drive 126, provided that the HLM BIOS 146 was configured to allow access to the drive 126.

By way of an example of operation, consider the two BIOS chips 144 and 146 of FIG. 1, which appears to the Southbridge 114 as a single BIOS chip. Regularly, the normal BIOS 144 is in effect, from which the system boots and otherwise accesses during normal operation. In a typical implementation, the normal BIOS 144 has no knowledge of the HLM BIOS 146.

FIG. 3 is a flow diagram with the left side thereof generally representing this normal operating state, in which normal boot occurs at step 304 as a result of boot path data accessed at step 302 directing the BIOS selector 142 to connect the normal BIOS 144 for booting normally (step 306).

Steps 308 and 310 represent metering the computing device for proper operation. Note that step 308 may include an inherent delay such that metering is intermittent rather than continuous, although continuous metering is feasible.

If step 310 detects a problem, the metering mechanism 140 sets the boot path data at step 312 so that the device will boot from the HLM BIOS on the next boot. Note that the metering mechanism 140 may trigger the BIOS selector 142 to reset the device (or may reset the device directly), however it is possible that an immediate reset is not desirable. For example, software may indicate that payment is due, and rather than immediately reboot and switch the user into limited operating mode, some number of warnings may be provided, during which the user can make a payment and not lose his or her current work. Step 314 gives the system this option, with step 316 representing the hard reset, or step 318 representing handling the problem detection otherwise, e.g., via a warning prompt by which the user may be able to switch the boot path data back to normal for the next boot. Note further that even if not resolved, the device can simply wait for the next boot rather than forcing a reboot, or can force a reboot after some time, such as to give a two-hour warning.

If the problem is not resolved before the next reboot, the next restart will retrieve the data at step 302 that indicates that the limited boot path should be taken at step 304. Step 320 represents connecting the HLM BIOS 146 for booting into the limited operating mode.

Steps 322 and 324 represent metering the computing device to determine if the problem is resolved. For example, the limited operation of the device may be used to download data that resolves the problem, e.g., a by downloading a set of one or more provisioning packets indicating payment has been made. Alternatively, the user may have restored the system, e.g., such that some metered code is now correctly executing. Note that the metering device can watch for infinite re-boots, e.g., bad code in normal operation forces a re-boot into limited mode which does not load the bad code, whereby the problem appears resolved, forcing a re-boot into normal code where the bad code is loaded and again detected, forcing another re-boot and so on. A timestamp or the like can watch for such a problem, upon which step 324 may not consider a recurrent problem resolved.

In a typical situation in which the problem is eventually resolved, step 326 resets the boot path to normal boot, which may be forced at steps 326 and 328, or may be by other means at step 330, e.g., following a prompt instructing the user to manually reboot after any work is saved.

It should be noted that steps 324 and beyond need not exist if another means for resetting the boot path data exists. For example, once in limited mode, there is no need to meter a computing device to determine whether the problem is resolved, if, for example, another trusted mechanism can change the data such that the device will reboot normally on the next reboot. However, each such mechanism provides a security risk, and thus limiting the control of the BIOS selector 142 to the embedded controller 140, and limiting access to the boot path data may be advantageous.

Note that additional enforcement techniques beyond those that boot a computer into a limited mode also may be employed. For example, when in limited mode, the embedded controller 140 may periodically force a reboot, e.g., every N minutes. Limiting the available RAM is another effective technique, because it allows execution of an out-of-HLM application that may be used to resolve the problem, while blocking other practical uses of the device. For example, the embedded controller 140 may reconfigure the memory controller's (NB) registers such that only some small amount of RAM is accessible; note that the embedded controller may need to repeatedly reconfigure the memory controller, otherwise another mechanism can reset the memory to a larger amount. Notwithstanding, these additional techniques are subject to external signaling, and thus are more easily tampered with than a multiple boot path solution as described herein.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing device, a method comprising:
    establishing a policy defining payment requirements for pay-per-use operation of the computing device;
    collecting policy data related to the policy;
    detecting that the policy data indicates the computing device is not compliant with policy defining payment requirements;
    rebooting the computing device into a limited mode of operation supporting only networking, keyboard/mouse, display and, a provisioning packet download application;
    connecting to a provisioning datacenter;
    downloading a provisioning packet from the provisioning datacenter, the provisioning packet representing payment related to pay-per-use operation for re-enabling normal operation of the computing device; and
    restricting the computing device to remain in the limited mode of operation until the computing device is compliant with the policy.

2. The method of claim 1 wherein rebooting the computing device into the limited mode of operation comprises booting the computing device from a boot path corresponding to the limited mode of operation instead of a boot path corresponding to a normal mode of operation.

3. The method of claim 2 wherein booting the computing device from a boot path corresponding to the limited mode of operation comprises:
    providing a secure execution environment including a BIOS selector that selects between a normal mode of operation BIOS and a limited mode of operation BIOS, the secure execution environment further providing secured access to the limited mode of operation BIOS; and
    setting the BIOS selector to boot the computing device from the limited mode of operation BIOS.

4. In a computing device, a system comprising:
    a metering mechanism that observes a state of the computing device after booting with a normal-function BIOS and operation of a full-function operating system with respect to compliance with subscription terms for pay-per-use operation of the computing device, wherein the metering mechanism saves state data about operating mode through a reboot of the computing device;
    a secure storage for storing a limited operating mode BIOS that, when active, limits operation of the computing device to an update-only mode of operation bypassing use of the normal-function BIOS; and
    a selector coupled to the metering mechanism to operate the computing device using the normal-function BIOS when the metering mechanism indicates the computing device was operating in a normal operation mode prior to reboot, or to operate the computing device using the limited operating mode BIOS when the metering mechanism indicates that the computing device was operating in a limited operating mode prior to reboot.

5. The system of claim 4 wherein the selector and the metering mechanism are incorporated into an application-specific integrated circuit.

6. The system of claim 5 wherein the application-specific integrated circuit is incorporated into a multiple-chip module, and wherein the multiple-chip module further includes at least one component that contains the normal-function BIOS and the limited operating mode BIOS.

7. The system of claim 4 wherein the metering mechanism, the selector, and the limited operating mode BIOS contained in a secure execution environment incorporated at least in part in a CPU of the computing device.

8. The system of claim 4 wherein the computing device comprises a personal computer, and wherein the metering mechanism, the selector, and the second set of instructions are contained in a secure execution environment incorporated in a Southbridge chip of the personal computer.

9. The system of claim 4 wherein the limited operating mode BIOS causes a memory controller to configure less system memory than is configured for the full operating mode, wherein the lesser amount of system memory supports operation of an application program used to restore compliance with subscription terms for pay-per-use operation of the computing device.

10. The system of claim 9 wherein the limited mode of operation is capable of executing logic to restore the state of the computer to use the normal-function BIOS to allow full-function operation, including the first boot path instructions.

\* \* \* \* \*